United States Patent
Peters

[15] 3,662,464
[45] May 16, 1972

[54] VAT UNLOADING AND HOOP FILLING APPARATUS FOR CHEESE CURD

[72] Inventor: Norman J. Peters, Fond du Lac, Wis.
[73] Assignee: DEC International, Inc., Madison, Wis.
[22] Filed: Oct. 13, 1970
[21] Appl. No.: 80,291

[52] U.S. Cl. .................................31/46, 31/89, 99/116, 177/88
[51] Int. Cl. .................................A01j 25/13
[58] Field of Search .................31/47, 48, 46, 89; 177/88; 99/116

[56] References Cited

UNITED STATES PATENTS

| | | | |
|---|---|---|---|
| 2,840,909 | 7/1958 | Dzenis | 31/46 |
| 3,060,575 | 10/1962 | Czulak | 31/47 |
| 3,140,185 | 7/1964 | Pinckney | 99/116 |
| 3,585,722 | 2/1969 | Leguex | 31/46 |

Primary Examiner—Aldrich F. Medbery
Attorney—Andrus, Sceales, Starke & Sawall

[57] ABSTRACT

A device for unloading cheese curd from a vat, weighing out a predetermined quantity of the curd and pre-pressing the curd within a hoop. The device includes a movable frame having a hopper adapted to be positioned adjacent the open end of the vat, and the curd is pushed out of the open end of the vat by a blade mechanism into the hopper. An upwardly inclined auger conveys the curd from the hopper and discharges the curd into a hoop located at a weighing station on the frame. After the desired weight of curd has been discharged into the hoop at the weighing station, the hoop is moved across a conveyor on the frame to a pre-pressing station where a platen acts to compress the curd within the hoop.

9 Claims, 4 Drawing Figures

PATENTED MAY 16 1972 3,662,464

INVENTOR.
NORMAN J. PETERS
BY
Attorneys

INVENTOR.
NORMAN J. PETERS
BY
Attorneys

3,662,464

VAT UNLOADING AND HOOP FILLING APPARATUS FOR CHEESE CURD

BACKGROUND OF THE INVENTION

This invention relates to a device for unloading cheese curd from a finishing vat, weighing out a predetermined quantity of the curd and pre-pressing the curd in a hoop or container.

In the conventional cheese making process for producing cheddar, colby or stirred curd cheese, the curd and whey are transferred from the cheese-making vat to a finishing vat where the curd is slowly agitated and the whey is drawn off. Subsequently, cheddar-type curd is milled and in all cases the moist curd is agitated by forking paddles which travel the length of the vat on a reciprocating carriage. In the traditional process, the curd is removed from the vat by manual shoveling and placed in hoops. Recently, finishing vats have been constructed with an open end enclosed by a hinged door. With a vat of this type, the curd, instead of being shoveled from the vat, is pushed out of the open door by a blade mechanism.

To facilitate filling of the hoops with the curd unloaded from the finished vat, portable unloading units have been employed. One such unloading unit to be utilized with an open end vat is described in the copending U.S. Pat. application, Ser. No. 871,441, filed Feb. 10, 1970 and entitled Cheese Making Apparatus. The unloading unit described in that patent application includes a hopper which is positioned adjacent the open end of the vat and receives the curd. Located within the hopper is a horizontal auger which moves the curd toward the center of the hopper where the curd is delivered through an opening to the lower end of an inclined auger, and the inclined conveyor then conveys the curd upwardly to an elevated location for filling of hoops.

SUMMARY OF THE INVENTION

The present invention is an improvement to the aforementioned patent application and incorporates with the unloading unit a weighing mechanism for weighing out a predetermined quantity of curd and a pre-pressing unit for compressing the weighed quantity of curd in the hoop.

More specifically, the invention includes a frame, composed of one or more individual sections, which is mounted on wheels for movement from vat-to-vat. Mounted on the frame is an unloading unit that receives the curd from the vat and conveys the curd to an elevated discharge location above the frame. The weighing mechanism or scale is positioned on the frame beneath the discharge end of the unloading unit and the curd is discharged into a hoop supported on the scale. When the desired quantity of curd has been introduced into the hoop, the discharge of curd is terminated and the filled hoop is transferred across a conveyor on the frame to the pre-pressing unit where a vertically movable platen is moved downwardly by a fluid cylinder to compress the curd within the hoop. Pressing serves to reduce the volume of the curd as well as forcing residual whey from the curd and outwardly through openings in the hoop.

The apparatus of the invention eliminates the manual labor normally involved in shoveling the curd from the finishing vat, and this not only minimizes spillage and waste of the curd, but a more sanitary operation results due to the fact that there is less human contact with the curd.

As the entire unit is portable, it can be moved from vat-to-vat, and therefore the apparatus can be employed with a series of vats in the cheese factory.

The use of the scale insures that a precise quantity of curd will be introduced into each hoop, thereby resulting in improved uniformity in weight from hoop to hoop.

Other objects and advantages will appear in the course of the following description.

The drawings illustrate the best mode presently contemplated of carrying out the invention.

DESCRIPTION OF THE PREFERRED EMBODIMENT

The drawings illustrate a finishing vat 1 to be used in a process for producing cheese, such as cheddar, colby, stirred curd or granulated, and which can also be used to produce certain types of Italian or Swiss cheese. An unloading and hoop filling unit 2 receives the curd from the vat, weighs out a predetermined quantity of curd and pre-presses the weighed quantity of curd in a hoop 3.

Figure 3:
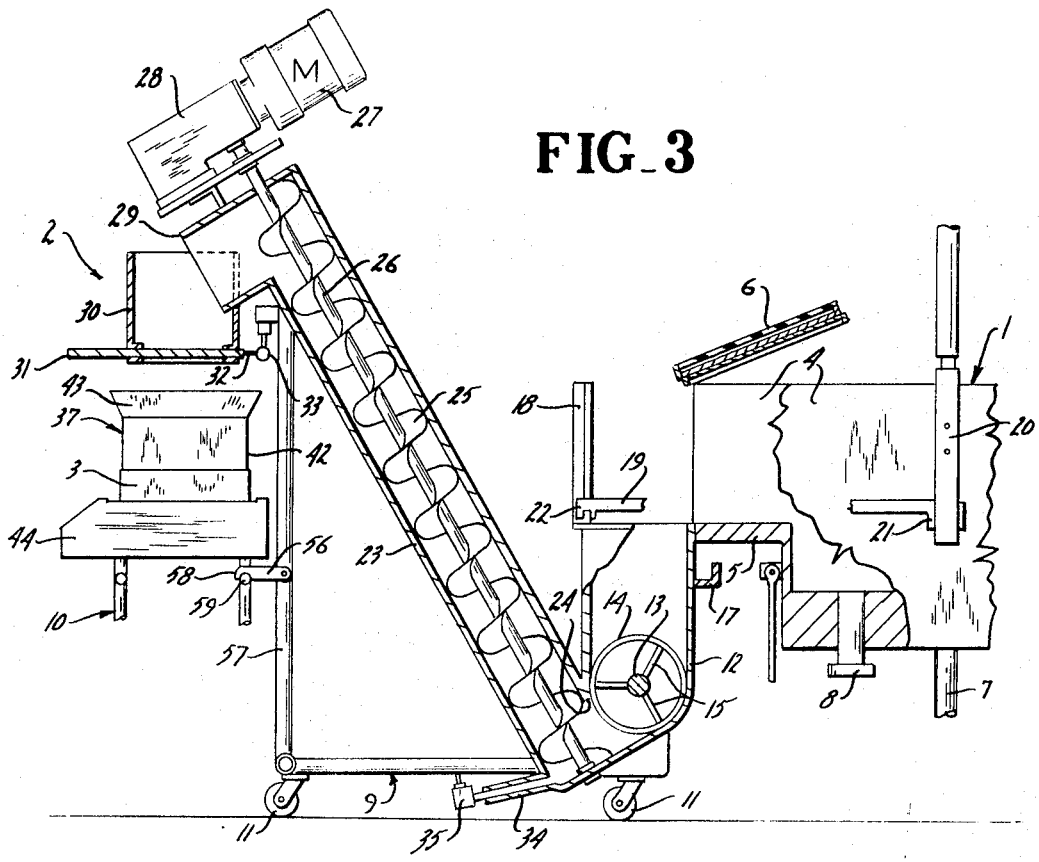
FIG. 3 is a vertical section of the unit as associated with the vat.

As best illustrated in FIG. 3, the vat 1 is a conventional type and includes a pair of side walls 4 which are connected at their lower edges by a sloping bottom wall 5. One end of the vat is open and is enclosed by a door 6 which is hinged to the upper portions of the side walls 4. As illustrated in FIG. 3, the door 6 is swung upwardly to its open position so that the curd within can be moved through the open end of the vat.

The vat is supported from the ground or foundation by a series of legs 7 and a drain 8 is provided in the vat adjacent the lower end of the bottom wall 5.

The unloading and hoop filling apparatus 2 of the invention includes a movable frame which can either be a single integral structure or a plurality of individual frame sections that are adapted to be removable connected together. As illustrated, the frame is composed of a pair of frame sections 9 and 10, each of which is mounted on a series of casters or wheels 11. The casters 11 are a common type, each having a brake or locking mechanism to enable the casters to be locked against movement. The frame section 9 supports an unloading unit including an open-topped hopper 12 which has a width slightly greater than the width of the vat 1 so that the curd can be pushed through the open end of the vat and into the hopper 12.

Mounted transversely within the hopper 12 is a shaft 13 and a pair of spirally arranged wires 14 are connected to the shaft by a series of radially extending wire supports 15. The spiral wires 14 have reverse pitches so that both spirals, when rotated, provide a gentle conveying action for moving the curd toward the center of the hopper 12.

The ends of the shaft 13 are journalled within the side walls of the hopper, and one end of the shaft 13 projects beyond the side wall and is connected to a drive unit 16 which includes a motor and speed reducing transmission.

Figures 1, 2:
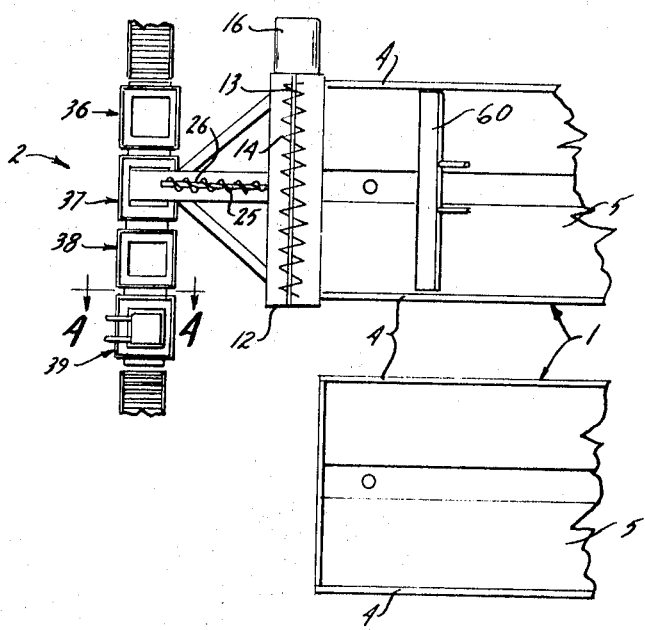
FIG. 1 is a schematic view showing the apparatus of the invention as associated with a vat in a cheese-making plant.
FIG. 2 is a front elevation of the apparatus.

The front wall of the hopper 12 is flat and is adapted to engage the end of the vat so that the curd from the vat can be pushed directly into the hopper. Located beneath the upper edge of the front wall of the hopper is a trough 17 which serves to collect any whey or small particles of curd which may fall through the joint between the front wall of the hopper and the end wall of the vat 1. The rear wall of the hopper 12 is provided with a vertical deflector plate 18 which serves to deflect the curd being pushed from the vat into the hopper. As the curd being discharged from the vat into the hopper will generate a substantial force against the hopper, the hopper is locked against the end wall of the vat. To provide this locking arrangement, a pair of arms 19 removably connect the supports 20 of vat 1 to the hopper. As shown in FIG. 2, one end of each arm is provided with a hook 21 which is engaged with the lower horizontal portion of the support 20, while the opposite end of each arm is provided with a second hook 22 which is engaged with the upper edge of the deflector plate 18. The ends of the deflector plate have a lesser height than the central portion so that the arms 19 are in a generally horizontal position when attached. This construction insures that the hopper 12 will be held firmly against the end wall of the vat 1.

An auger housing 23 is connected to the hopper 12 and extends upwardly at an incline from the hopper, and an opening 24 provides communication between the central portion of the hopper and the lower end of the auger housing. As the wire spirals 14 rotate, the curd is moved toward the center of the hopper 12 and is delivered through the opening 24 into the lower end of the housing 23 where it is elevated within the housing by an auger or spiral flight 25. The shaft 26 of the auger 25 is driven by a motor 27 acting through a speed reducing unit 28. The motor 27 and speed reducing unit are mounted on the upper end of the housing 23.

The cheese curd being moved upwardly within the housing 23 by auger 25 is discharged through a chute 29 into a generally box-shaped hopper 30 which is connected to the chute. The lower end of the hopper 30 is enclosed by a sliding door 31 which is adapted to slide within guideways or grooves formed in the lower end of the hopper 30. The door 31 can be moved between the open and closed positions either manually or by power means. When the auger 25 is operating and the door 31 is open the cheese curd will be discharged from the hopper into one of the hoops 3.

A provision is incorporated to stop the operation of the hopper motor 16, as well as the elevator motor 27 when the door 31 is moved to the close position. This is accomplished by providing the door with a projecting end or rod 32 which is arranged to engage a switch 33 mounted on the frame 9 when the slide door 31 is moved to the closed position. Actuation of the switch 33 serves to open the circuit to the motors 16 and 27 to stop the elevation of the cheese curd.

The lower end of the auger housing is provided with a draining opening 34 which is normally enclosed by a drain plug or gate 35. During cleaning, the drain gate is opened and water used for flushing will drain from both the hopper 12 and the housing 23 through the drain 34.

The frame section 10 defines a hoop-receiving station 36, a weighing station 37, a transfer station 38 and a pre-pressing station 39 and a series of generally rectangular subframes 40 are mounted on the frame section 10 at the stations 36–39.

At the hoop receiving station 36, the sub-frame 40 supports a series of conveyor rolls 41 which are mounted for rotation on transverse shafts and the ends of the shafts are supported in opposite sides of the sub-frame. A hoop 3 having a filling sleeve 42 and funnel 43 located in its upper open end can be positioned on the conveyor rollers 41 prior to the hoop being moved to the weighing station 37.

The sub-frame 40 at the weighing station 37 supports a conventional scale 44, and the hoop 3 is manually positioned on the scale in a location directly beneath the hopper 30. Opening the sliding door 31 will initiate operation of the spirals 14 and auger 25 and the cheese curd will be discharged from the hopper 30 into the hoop 3 which is supported on the upper surface of the scale 44. The operator will close the door 31 in the hopper 30 to terminate the flow of cheese curd when the desired weight of curd has been introduced into the hoop as determined by the reading on the scale 44.

The sub-frame 40 at the transfer station 38 supports a series of conveyor rollers 45 which are journalled on transverse shafts 46, and the ends of the shafts are mounted on mounted on opposite sides of the sub-frame. The filled hoop 3 can be transferred from the upper surface of the scale 44 across the conveyor rollers 45 to the pre-press station 39.

The pre-press station 39 includes a fixed table or support 47 which is mounted on the sub-frame 40 and a pair of guide rails 48 and 49 are located along the longitudinal sides of the table. Supported on the table 47 is a generally L-shaped stop 50 which is adapted to receive a corner of the hoop 3. By positioning the corner of the hoop 3, in registry with the L-shaped stop 50 the hoop will be properly aligned on the table 47 for the pressing operation.

Figure 4:
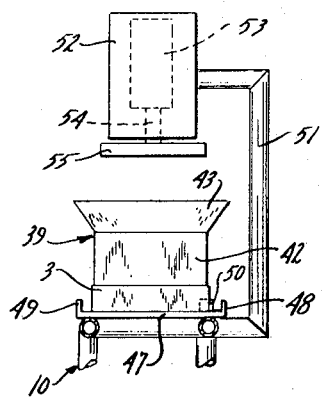
FIG. 4 is a section taken along line 4—4 of FIG. 3.

As illustrated in FIG. 4, a pair of arms 51 are attached to the sub-frame 40 at the pre-pressing station and extend upwardly from the sub-frame. The upper ends of the arms carry a casing 52 which houses a fluid cylinder 53 having a ram 54. The lower end of the ram 54 carries a platen 55 which has a size and shape to complement the interior of the hoop so that the platen can be moved downwardly within the hoop sleeve 42 to compress the curd within the hoop. By introducing fluid pressure into the upper end of the cylinder 53, the ram 54 and platen 55 will be moved downwardly to press the curd within the hoop, and by introducing fluid into the lower end of the cylinder the platen will be raised to a position above the funnel 43 so that the hoop can be introduced and withdrawn from the pre-pressing station 39.

The drawings illustrate the frame as composed of a pair of frame sections 9 and 10 although it is contemplated that a single integral frame can be utilized. The frame 9 is removably attached to the frame 10 by a pair of pivotable brackets 56 which are attached to the vertical supports 57 of frame 9 and the hooked ends 58 of the brackets are adapted to engage the horizontal supports 59 of frame 10 to prevent relative movement of the frames.

In operation of the apparatus of the invention, a hoop 3 is positioned at the receiving station 36 and the filling sleeve 42 and funnel 43 are positioned in the upper end of the hoop. The hoop 3 is then slid across the conveyor rolls 41 to a location on scale 44 beneath the discharge hopper 30 of the unloader.

The door 6 on the vat is moved to the open position and the cheese curd is then pushed out of the open end of the vat by a blade mechanism 60 and into the hopper 12. The operator then moves the door or gate 31 in the hopper 30 to the open position and this actuates the motors 16 and 27 to thereby elevate the curd from the hopper 12 and discharge it through the lower end of the hopper 30 into the hoop. The operator observes the weight of the curd being introduced into the hoop on scale 44 and when the desired weight of curd has been introduced into the hoop, the operator shuts the door 31 thereby turning off the drive for the elevator.

The filled hoop 3 is then moved across the conveyor rolls 45 to the pre-pressing station 39 and the corner of the hoop is positioned against the stop 50 so that the hoop will be in vertical alignment with the platen 55. The operator then operates the cylinder 53 through a valve control unit to lower the platen 55 and compress the curd downwardly into the hoop. As the hoop is provided with a perforated bottom, residual whey will be pressed from the curd and discharged through the perforations in the hoop.

After the pressing, the platen 55 is elevated and the hoop 3 can then be moved to the final pressing stage.

The apparatus of the invention, being portable, can be moved from vat-to-vat and therefore can service a number of vats in the cheese factory. The apparatus serves to elevate the curd, weigh out a predetermined quantity of the curd and subsequently press the weighed curd into the hoop. This substantially reduces the manual labor that is normally required for these operations and also minimizes spillage and waste of the curd and provides a more sanitary operation.

The unit is flexible in that the various components can be positioned on the frame as desired for a specific installation. For example, the pre-pressing station can be located on either side of the weighing station, and the weighing station need not be positioned directly beneath the discharge hopper 30, but instead the hoop can be filled with the cheese curd and then transferred to the weighing station where curd can either be added or removed from the hoop to obtain the desired weight. This flexibility can be achieved by making each of the units, such as the unloading unit, the weighing unit, the transfer unit and the pre-pressing unit, separate portable structures which can be connected together in the desired relationship for a specific installation.

Various modes of carrying out the invention are contemplated as being within the scope of the following claims particularly pointing out and distinctly claiming the subject matter which is regarded as the invention.

I claim:

1. An apparatus for unloading cheese curd from a vat and discharging a weighed amount of the curd into a container, comprising a frame, wheel means to support the frame for movement, a hopper mounted on the frame for receiving the curd from the vat, elevator means for elevating the curd from the hopper to an elevated location, said elevator means having a discharge opening at said elevated location, control means for opening and closing said discharge opening and controlling the discharge of the curd, weighing means located on the frame beneath said discharge opening for supporting a container to receive curd when the discharge opening is in the open position, and pre-press means located on the frame adjacent said weighing means for compressing the curd within the container.

2. The apparatus of claim 1, and including conveying means mounted on the frame for conveying the filled container from the weighing means to the pre-press means.

3. The apparatus of claim 1, wherein said control means comprises a valve member which is movable between an open and a closed position.

4. The apparatus of claim 1, wherein said pre-press means includes a fixed platform mounted on the frame, and a vertically movable platen disposed above the platform, said platen being movable downwardly into the container to compress the curd therein.

5. The apparatus of claim 4, and including stop means located on said platform to be engaged by the container and position the container in alignment with said platen.

6. An apparatus for unloading cheese curd from a vat and discharging a weighed amount of curd into a container, comprising a frame, wheel means to support the frame for movement, said frame defining in series a receiving station, a weighing station, a transfer station and a pre-pressing station with said stations being located in substantially the same horizontal plane, a hopper to receive curd from the vat, elevator means for elevating the curd from the hopper and having a discharge opening located in alignment above said weighing station whereby a container located at the weighing station can be filled with curd, valve means associated with the discharge opening for opening and closing the same, a scale located at the weighing station to support a container at said weighing station, conveying means at said transfer station for transferring a filled container from the weighing station to the pre-pressing station, and pressing means located at the pre-pressing station for compressing the curd within the container.

7. The apparatus of claim 6, wherein said scale has a generally flat upper surface disposed in substantially the same horizontal plane as said conveyor means.

8. The apparatus of claim 6, wherein said elevator means includes a discharge chute and said opening is located at the lower end of said discharge chute, said valve means being a door slidably mounted with respect to the chute to open and close said opening.

9. The structure of claim 6, and including means responsive to moving the valve member to the closed position for discontinuing operation of said elevator means, and means responsive to moving of said valve means to the open position for initiating operation of said elevator means.

* * * * *